United States Patent
Kanehara et al.

[11] Patent Number: 6,090,004
[45] Date of Patent: Jul. 18, 2000

[54] BELT FOR A CONTINUOUSLY VARIABLE TRANSMISSION

[75] Inventors: Shigeru Kanehara; Hideaki Yoshida; Hirofumi Akagi; Tooru Yagasaki, all of Wako; Tooru Fujii, Kyoto; Shinya Kuwabara, Wakayama, all of Japan

[73] Assignee: Honda Giken Kogyo Kabushiki Kaisha, Tokyo, Japan

[21] Appl. No.: 09/168,935

[22] Filed: Oct. 9, 1998

[30] Foreign Application Priority Data

Oct. 14, 1997 [JP] Japan ................................. 9-280090

[51] Int. Cl.$^7$ ........................................... F16G 1/21
[52] U.S. Cl. ........................... 474/242; 474/201; 474/272
[58] Field of Search .................................. 474/242, 272, 474/201, 237, 240, 244, 265, 245

[56] References Cited

U.S. PATENT DOCUMENTS

| | | | |
|---|---|---|---|
| 3,720,113 | 3/1973 | Van Doorne et al. | 474/242 |
| 4,332,575 | 6/1982 | Hendriks | 474/242 X |
| 5,169,369 | 12/1992 | Masuda et al. | 474/242 |
| 5,180,345 | 1/1993 | Van Der Zande | 474/242 X |
| 5,346,440 | 9/1994 | Smeets | 474/242 |

FOREIGN PATENT DOCUMENTS

| | | |
|---|---|---|
| 0 014 014 A1 | 8/1980 | European Pat. Off. . |
| 62-97344 | 6/1987 | Japan . |
| 2-22254 | 5/1990 | Japan . |
| 2 184 513 | 6/1987 | United Kingdom . |

OTHER PUBLICATIONS

Patent Abstracts of Japan, vol. 009, No. 242 (M–417), Sep. 28, 1985 & JP 60 095234 A, May 28, 1985.
Patent Abstracts of Japan, vol. 011, No. 388 (M–652), Dec. 18, 1987 & JP 62 155350 A, Jul. 10, 1987.

*Primary Examiner*—David A. Bucci
*Assistant Examiner*—Marcus Charles
*Attorney, Agent, or Firm*—Arent Fox Kintner Plotkin Kahn

[57] ABSTRACT

A belt for a continuously variable transmission in which an aggregate of metal rings formed by laminating a plurality of pieces of endless metal rings support a plurality of metal blocks. When the ratio $\xi$ of the coefficient of friction is set to be $2.0 > \xi > 0.65$, the amount of change in the tension on the metal ring of the innermost position decreases correspondingly. In particular, when the ratio $\xi$ of the coefficient of friction is set to be 1.0, resulting in the coefficient of friction $\mu_s$ between a ring and a block being equal to the coefficient of friction $\mu_{ss}$ between a ring and a ring, the amount of change in the tension on all metal rings become uniform, and each metal ring shares an amount of change in the tension which is 8% of the entire amount. This makes it possible to decrease the amount of change in the tension on the metal ring of the innermost position and, hence, to increase the durability of the aggregate of metal rings as a whole.

4 Claims, 9 Drawing Sheets

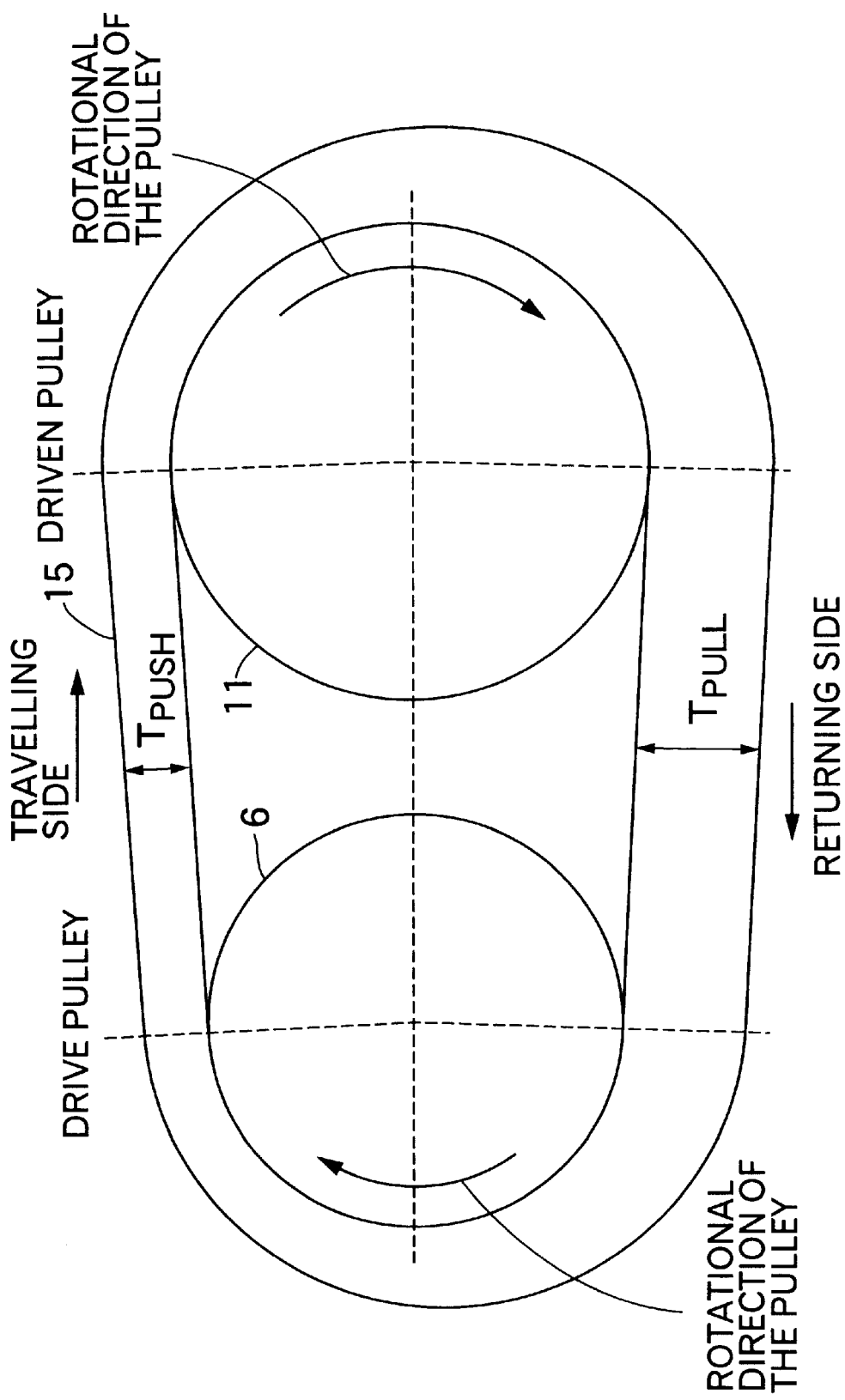

BELT FOR A CONTINUOUSLY VARIABLE TRANSMISSION

BACKGROUND OF THE INVENTION

1. Field of the Invention

The present invention relates to a belt for a continuously variable transmission in which a number of metal blocks are supported by an aggregate of metal rings formed by laminating a plurality of pieces of endless metal rings one on another.

2. Description of the Related Art

A belt for a continuously variable transmission has been known in Japanese Patent Publication (Kokoku) No. 2-22254 according to which, in order to enhance the durability of the belt, the belt comprises an aggregate of metal rings and metal blocks, with mesh-like protuberances formed on the inner peripheral surfaces of the metal rings forming the aggregate of metal rings, thereby decreasing the coefficient of friction. A belt has also been known in Japanese Utility Model Publication (Kokai) No. 62-97344 according to which oil grooves are formed in the saddle surfaces of the metal blocks which come into contact with the inner peripheral surface of a metal ring of the innermost position of the aggregate of metal rings, thereby holding an oil film and decreasing the coefficient of friction.

In the conventional metal rings forming the aggregate of metal rings, the innermost metal ring that comes into contact with the saddle surfaces of the metal blocks and other metal rings (at the second position and outer positions) are all formed into the same. However, while the metal ring of the innermost position comes into contact with the saddle surfaces of the metal blocks, the inner peripheral surfaces of the other metal rings come in contact with the outer peripheral surfaces of their adjacent metal rings, and hence their contacting portions have different coefficients of friction. It has been determined by measurement that the coefficient of friction on the inner peripheral surface of the metal ring of the innermost position that comes into contact with the saddle surfaces of the metal blocks, is generally about twice as great as the coefficient of friction on the inner peripheral surface of the other metal rings.

As will be described later in detail, when a metal belt wrapped round a drive pulley and a driven pulley circulates, the tension acting on the aggregate of metal rings of the metal belt undergoes a periodic change. When the coefficient of friction is the same throughout the inner peripheral surfaces of all metal rings, the tension acting on the metal rings changes by the same amount. In practice, however, the coefficient of friction on the inner peripheral surface of the metal ring of the innermost position is greater than the coefficient of friction on the inner peripheral surfaces of the other metal rings and hence, the tension acting on the metal ring of the innermost position changes by an amount greater than the amount of change of the tension that acts on the other metal rings. As a result, the metal ring of the innermost position receives a stress greater than that exerted on the other metal rings, and loses durability. The durability of the metal ring of the innermost position imposes a limitation on the durability of the whole metal belt.

SUMMARY OF THE INVENTION

The present invention has been accomplished in view of the above-mentioned circumstances, and its object is to improve the durability of the aggregate of metal rings as a whole by decreasing the amount of change in the tension acting on the metal ring of the innermost position.

In order to accomplish the above-mentioned object according to a first feature of the present invention, there is provided a belt for a continuously variable transmission in which a number of metal blocks are supported by an aggregate of metal rings formed by laminating plural pieces of endless metal rings one on another and a plurality of metal blocks having saddle surfaces, the metal blocks are supported by the metal rings, wherein the ratio of the coefficient of friction between an innermost one of the metal rings contacting the saddle surfaces of the metal blocks and the saddle surfaces to the coefficient of friction between the metal rings contacting one another, is smaller than 2.0 and larger than 0.65.

According to a second feature of the present invention, there is provided a belt for a continuously variable transmission, wherein the coefficient of friction between the innermost metal ring contacting the saddle surfaces of the metal blocks and the saddle surfaces is substantially the same as the coefficient of friction between the metal rings contacting one another.

According to a third feature of the present invention, there is provided a belt for a continuously variable transmission, wherein each of the metal rings has a plurality of protruding stripes on an inner peripheral surface thereof, the stripes are inclined relative to the direction of movement of the metal ring, and wherein the angle of inclination of the stripes of the innermost metal ring is larger than the angle of inclination of the stripes on the other metal rings.

According to the above-described apparatus, the following action and effect are accomplished. That is, when all of the plurality of metal rings that are laminated one on another have equal frictional characteristics on their inner peripheral surfaces, the coefficient of friction on the inner peripheral surface of the metal ring of the innermost position contacting the saddle surfaces of the metal blocks is approximately twice as great as the coefficient of friction of the metal rings contacting one another. Therefore, the amount of change in the tension acting on the metal ring of the innermost position becomes greater than the amount of change in the tension on the other metal rings, serving as a factor for decreasing the durability of the aggregate of metal rings as a whole. When the ratio of the coefficient of friction on the inner peripheral surfaces of the other metal rings to the coefficient of friction on the inner peripheral surface of the metal ring of the innermost position is selected to be smaller than 2.0, however, the difference in the amount of change in the tension on the metal rings is decreased and hence, the durability of the aggregate of the metal rings as a whole is improved. When the ratio of the coefficient of friction is less than 0.65, the effect is not obtained for decreasing the difference in the amount of change in the tension on the metal rings. Therefore, the ratio $\xi$ is selected to be $0.65<\xi<2.0$. In particular, when the coefficient of friction on the inner peripheral surface of the metal ring of the innermost ring is brought to be nearly equal to the coefficient of friction on the inner peripheral surfaces of the other metal rings, it is allowed to make the amount of change in the tension on the metal rings uniform and, hence, to further effectively improve the durability of the aggregate of metal rings as a whole.

When the metal rings have a number of protruding stripes on the inner peripheral surfaces thereof, the angle of inclination of the protruding stripes may be changed to adjust the coefficient of friction. The coefficient of friction decreases with an increase in the angle of inclination of the protruding stripes. Therefore, when the angle of inclination of the protruding stripes on the metal ring of the innermost ring is set to be larger than the angle of inclination of the protruding stripes on the other metal rings, it is allowed to decrease the difference between the amount of change in the tension on the metal ring of the innermost ring and the amount of change in the tension on the other metal rings.

The above and other objects, features and advantages of the present invention will become obvious from the description of a preferred embodiment described below in detail in conjunction with the accompanying drawings.

BRIEF DESCRIPTION OF THE DRAWINGS

FIGS. 1 to 8 are diagrams illustrating an embodiment of the present invention, wherein:

FIG. 1 is a skeletal diagram of a power transmission system of a vehicle having a continuously variable transmission;

FIG. 2 is a perspective view of a metal belt portion of the embodiment of the present invention;

FIG. 3 is a perspective view of a metal ring;

FIG. 4 is a diagram illustrating the distribution of tension on the metal belt in a belt-type continuously variable transmission;

FIG. 5 is a diagram illustrating the forces on the metal rings;

FIG. 6 is a graph illustrating a change in the ratio $\xi$ of the coefficient of friction, i.e., a change in $\Delta T_1 / \Delta T_{ALL}$;

FIG. 7 is a graph illustrating regions of suitable combinations of the coefficient of friction $\mu_s$ between a ring and a block and the coefficient of friction $\mu_{SS}$ between a ring and another ring; and FIG. 8 is a graph showing a change in the permissible input torque to the continuously variable transmission with respect to the coefficient of friction $\mu_s$ between a ring and a block.

DESCRIPTION OF THE PREFERRED EMBODIMENT

An embodiment of the present invention will now be described with reference to the drawings.

Figure 1:
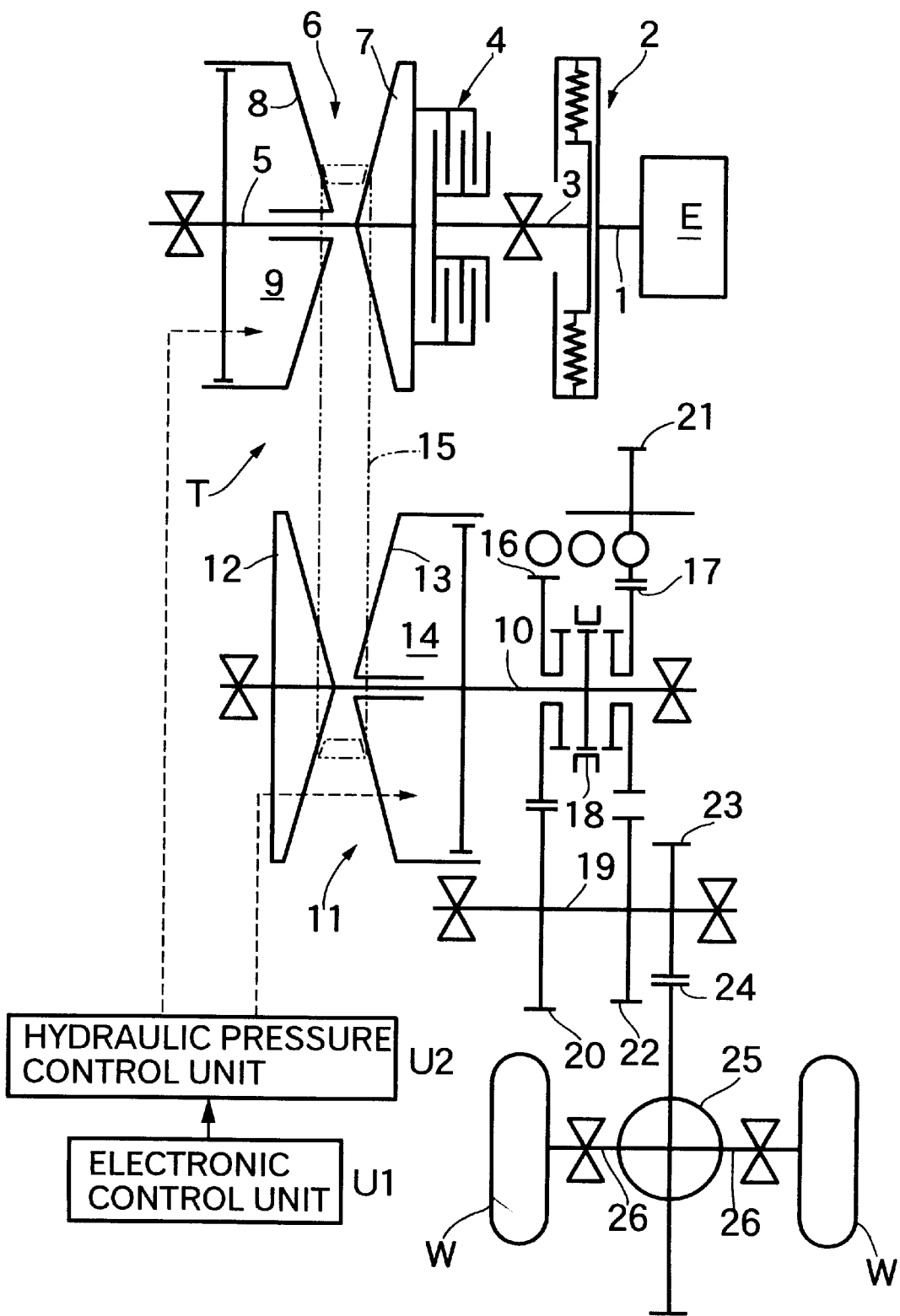

FIG. 1 schematically illustrates the structure of a metal belt-type continuously variable transmission T mounted in an automobile. An input shaft 3 is connected, via a damper 2, to a crankshaft 1 of an engine E, and is connected to a drive shaft 5 of the metal belt-type, continuously variable transmission T via a clutch 4 for starting. A drive pulley 6 provided on the drive shaft 5 includes a half pulley 7 which is the fixed side of the pulley secured to the drive shaft 5 and a half pulley 8, which is the moving side of the pulley, capable of coming in contact with, and separating away from, the half pulley 7 of the fixed side. The half pulley 8 of the moving side is urged toward the half pulley 7 of the fixed side by hydraulic pressure in an oil chamber 9.

A driven pulley 11 provided on a driven shaft 10 arranged in parallel with the drive shaft 5 includes a half pulley 12 of the fixed side of the pulley 11, secured to the driven shaft 10 and a half pulley 13 of the moving side of the pulley 11, capable of coming in contact with, and separating away from, the half pulley 12 of the fixed side. The half pulley 13 of the moving side is urged toward the half pulley 12 of the fixed side by the hydraulic pressure in an oil chamber 14. A metal belt 15 is wrapped round the drive pulley 6 and the driven pulley 11, the metal belt 15 comprising a number of metal blocks 32 supported by a pair of right and left aggregates 31 of metal rings (see FIG. 2).

Figure 3:
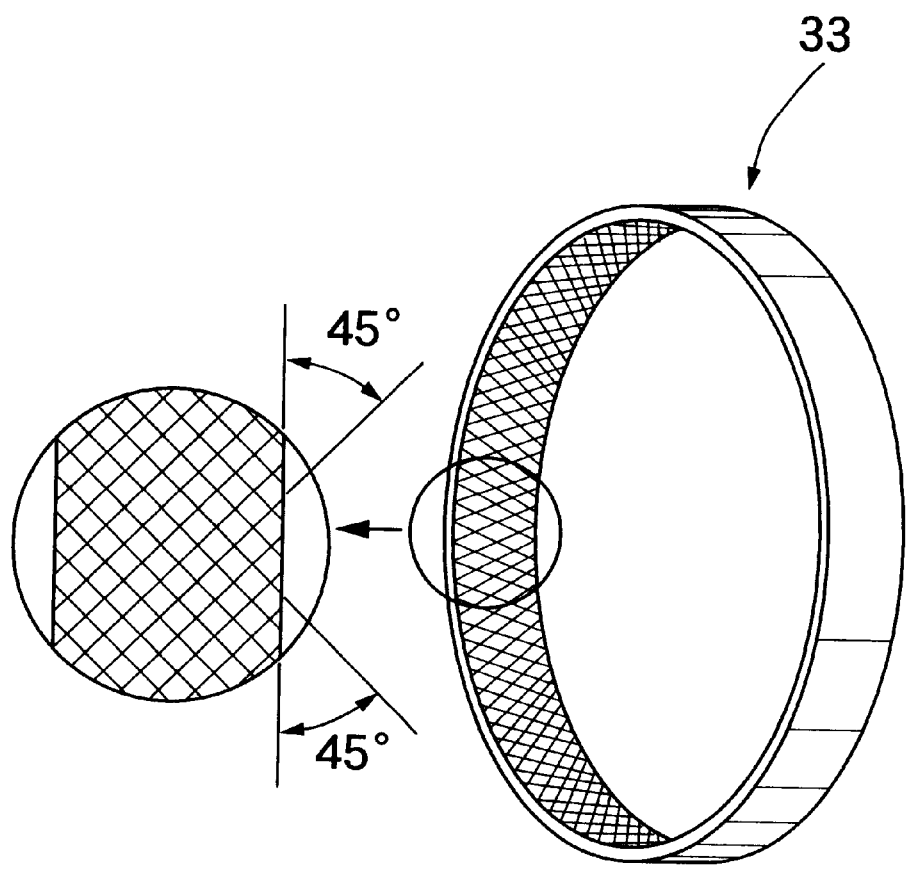

Each aggregate 31 of metal rings comprises twelve metal rings 33. FIG. 3 shows a metal ring 33, and on the inner peripheral surface thereof is formed a mesh of a number of protruding stripes for adjusting the coefficient of friction. The protruding stripes are inclined toward the right and left at an angle of about 45° with respect to the direction of motion of the metal ring 33.

On the driven shaft 10 are supported a drive gear 16 for forward driving and a drive gear 17 for reverse driving, which rotate relative to each other. The drive gear 16 for forward driving and the drive gear 17 for reverse driving can be selectively coupled to the driven shaft 10 by using a selector 18. An output shaft 19 arranged in parallel with the driven shaft 10, has a driven gear 20 secured thereto for forward driving in mesh with the drive gear 16 and a driven gear 22 secured thereto for reverse driving in mesh with the drive gear 17 via an idle gear 21 for reverse driving.

The rotation of the output shaft 19 is inputted to a differential 25 through a final drive gear 23 and a final driven gear 24, and is transmitted to driven wheels W through the right and left axles 26.

The driving force of the engine E is transmitted to the driven shaft 10 through the crank shaft 1, the damper 2, the input shaft 3, the clutch 4 for starting, the drive shaft 5, the drive pulley 6, the metal belt 15 and the driven pulley 11. When a forward travel range is selected, the driving force of the driven shaft 10 is transmitted to the output shaft 19 through the drive gear 16 for forward driving and the driven gear 20 for forward driving, so that the vehicle is caused to travel forward. When a reverse travel range is selected, the driving force of the driven shaft 10 is transmitted to the output shaft 19 through the drive gear 17 for reverse driving, the idle gear 21 for reverse driving and the driven gear 22 for reverse driving, so that the vehicle is caused to travel in reverse.

In this case, the hydraulic pressure in the oil chamber 9 of the drive pulley 6 and in the oil chamber 14 of the driven pulley 11 in the metal belt-type continuously variable transmission T, are controlled by a hydraulic pressure control unit U2 that is actuated by an instruction from an electronic control unit U1, so that the transmission gear ratio can be continuously adjusted. That is, when the hydraulic pressure in the oil chamber 14 of the driven pulley 11 is increased relative to the hydraulic pressure in the oil chamber 9 of the drive pulley 6, the width of the groove of the driven pulley 11 decreases and the effective radius increases. Therefore, the width of the groove of the drive pulley 6 increases and the effective radius decreases. Accordingly, the transmission gear ratio of the metal belt-type continuously variable transmission T continuously varies toward the step of LOW. Conversely, when the hydraulic pressure in the oil chamber 9 of the drive pulley 6 is increased relative to the hydraulic pressure in the oil chamber 14 of the driven pulley 11, the width of groove of the drive pulley 6 decreases and the effective radius increases. Therefore, the width of groove of the driven pulley 11 increases and the effective radius decreases. Accordingly, the transmission gear ratio of the metal belt-type continuously variable transmission T continuously varies toward the step of OD.

FIG. 4 illustrates a state where the metal belt 15 is wrapped round the drive pulley 6 and the driven pulley 11, and wherein the thickness of the metal belt schematically represents the magnitude of tension of the metal belt. The tension remains constant $T_{PUSH}$ in the chord of the travelling side of the metal belt 15 delivered from the drive pulley 6 to the driven pulley 11, and the tension remains constant $T_{PULL}$ in the chord of the returning side of the metal belt 15 returning from the driven pulley 11 to the drive pulley 6. The tension $T_{PUSH}$ of the travelling side is smaller than the tension $T_{PULL}$ of the returning side. The tension decreases from $T_{PULL}$ to $T_{PUSH}$ at a portion where the metal belt 15 is wrapped round the drive pulley 6 from the inlet side to the outlet side thereof. The tension increases from $T_{PUSH}$ to $T_{PULL}$ at a portion where the metal belt 15 is wrapped round the driven pulley 11 from the inlet side to the outlet side thereof.

Figure 5:
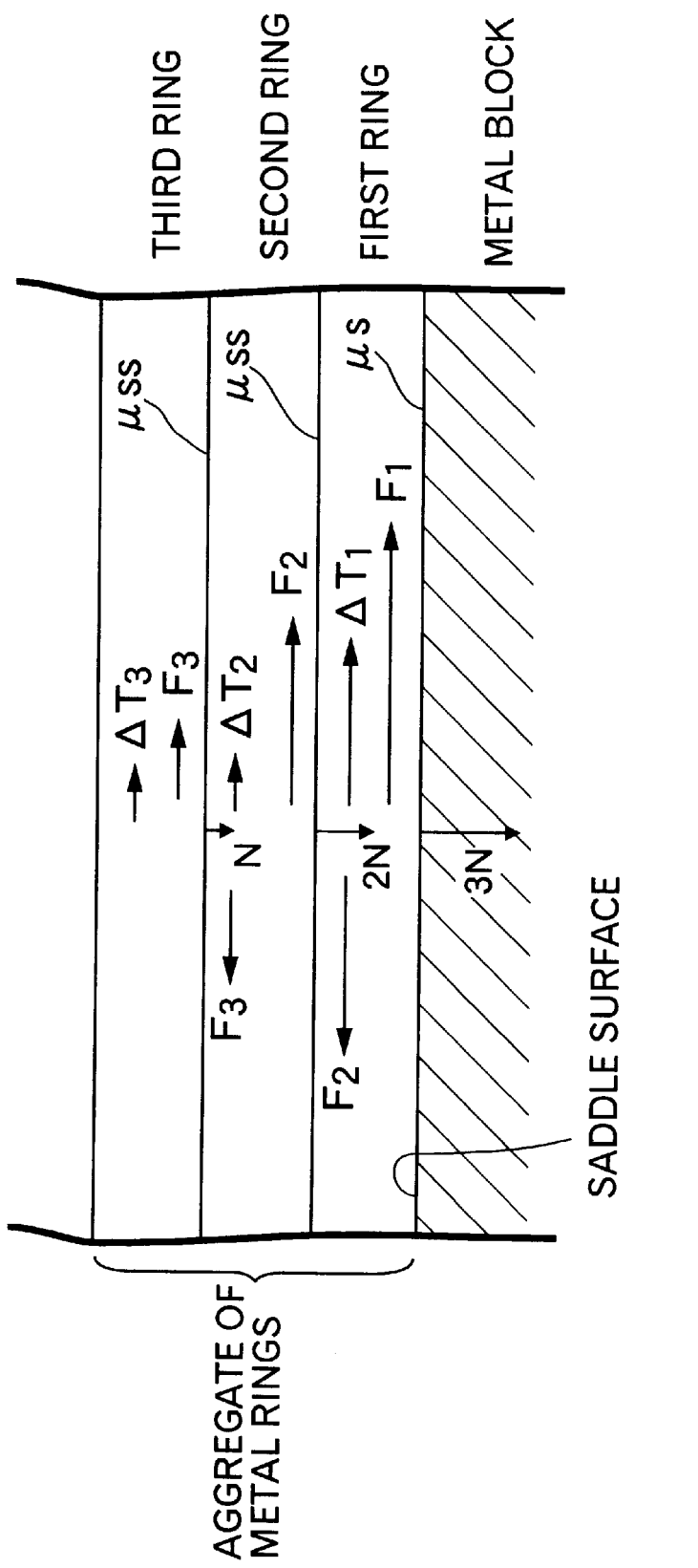

The tension of the metal belt 15 is evenly shared by the pair of aggregates 31 of metal rings, and the tension of each aggregate 31 of metal rings is carried by twelve metal rings 33 forming the aggregate 31 of metal rings. Here, the tension is equal among the eleven pieces of metal rings 33, which are the second to the twelfth layers, the first layer being the metal ring 33 of the innermost position that is in contact with saddle surfaces $32_1$ of the metal blocks 32, and the tension of the metal ring 33 of the innermost position becomes different from the tension of the metal rings 33 of the second to the twelfth layers. The reason will now be described with reference to FIG. 5.

First, described below, as a simplified model, is the case where the aggregate of metal rings is formed by the metal rings of the three layers. If it is now presumed that a normal reaction N is acting between the third ring of the outermost layer and the second ring on the inner side thereof in the portion which is wrapped on the pulley, then, a normal reaction 2N acts between the second ring and the first ring, and a normal reaction 3N acts between the first ring and the saddle surfaces of the metal blocks. Here, the coefficient of friction between the metal rings contacting each other (hereinafter referred to as coefficient of friction between a ring and a ring) is denoted by $\mu_{SS}$, the coefficient of friction between a metal ring and a metal block (hereinafter referred to as coefficient of friction between a ring and a block) is denoted by $\mu_s$, and the loads exerted on the first ring, second ring and third ring are denoted by $F_1$, $F_2$ and $F_3$, respectively. Then, the amounts of change $\Delta F_1$, $\Delta F_2$ and $\Delta F_3$ in the tension on the metal rings are given by the following formulas (1) to (3), $$\Delta T_3 = F_3 = \mu_{SS}N \quad (1)$$

$$\Delta T_2 = F_2 - F_3 = 2\,\mu_{SS}N - \mu_{SS}N = \mu_{SS}N \quad (2)$$

$$\Delta T_1 = F_1 - F_2 = 3\,\mu_s N - 2\,\mu_{SS}N \quad (3)$$

That is, both the amounts of change $\Delta T_2$ and $\Delta T_3$ in the tension on the second ring and the third ring having an equal coefficient of friction $\mu_{SS}$ on the inner peripheral surfaces thereof become equal to $\mu_{SS}N$. However, the amount of change $T_1$ in the tension on the first ring having the coefficient of friction $\mu_s$ on the inner peripheral surface thereof becomes $3\mu_s N - 2\mu_{SS}N$ which is different from $\Delta T_2$ and $\Delta T_3$.

The ratio of $\Delta T_2$ to $\Delta T_1$ is given by, $$\Delta T_1/\Delta T_2 = (3\,\mu_s N - 2\,\mu_{SS}N)/\mu_{SS}N \quad (4)$$

When the formula (4) is expanded to the case where there are laminated n pieces of metal rings, then, there is obtained a formula, $$\Delta T_1/\Delta T_2 = \{n\mu_s - (n-1)\mu_{SS}\}/\mu_{SS} \quad (8)$$

Here, if the ratio of the coefficient of friction, which is a ratio of the coefficient of friction $\mu_{SS}$ between a ring and a ring to the coefficient of friction $\mu_s$ between a ring and a block, is denoted by $\xi(=\mu_s/\mu_{SS})$, then, the formula (8) can be rewritten as follows:

$$\Delta T_1/\Delta T_2 = n\xi - (n-1) = n(\xi - 1) + 1 \quad (9)$$

The sum $\Delta T_{ALL}$ of the amounts of change $\Delta T_1$ to $\Delta Tn$ in the tension on n pieces of metal rings forming the aggregate of metal rings is given by, $$\Delta T_{ALL} = \Delta T_1 + \Delta T_2 + \cdots + \Delta T_{12}$$

$$= (n-1)\Delta T_2 + \Delta T_1$$

$$= (n-1)\Delta T_2 + \{n(\xi - 1) + 11\}\Delta T_2$$

$$= n\xi \Delta T_2 \quad (10)$$

Therefore, when $\Delta T_2$ is erased from the formulas (9) and (10), then, there is obtained a formula, $$\Delta T_1/\Delta T_{ALL} = \{n(\xi - 1) + 1\}/n\xi \quad (11)$$

The above-mentioned formula (11) indicates that when the number n of metal rings included in the aggregate of metal rings is determined and the ratio $\xi$ of the coefficient of friction $\mu_{SS}$ between a ring and a ring to the coefficient of friction $\mu_s$ between a ring and a block is determined, then, the ratio of the amount of change $\Delta T_{ALL}$ in the tension on the whole laminate of metal rings to the amount of change $\Delta T_1$ in the tension on the metal ring of the innermost position can be determined.

Figure 6:
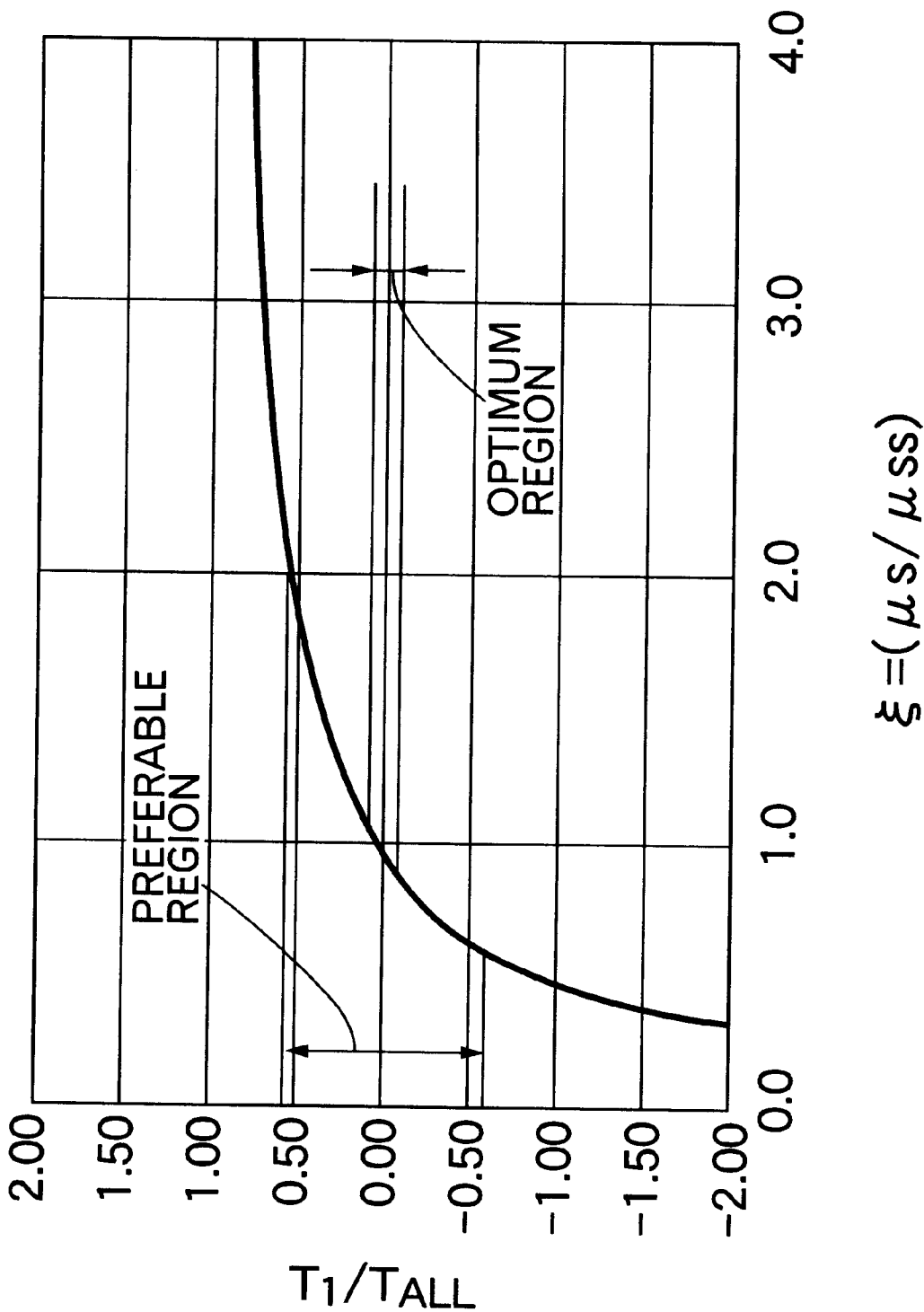

The graph of FIG. 6 shows the calculated results of the ratios $\Delta T_1/\Delta T_{ALL}$ for various ratios $\xi$ of the coefficient of friction when the aggregate of metal rings is formed by twelve metal rings (i.e., n=12). According to experiments and the measured results, when the metal ring of the innermost position is the same as the other metal rings, the coefficient of friction $\mu_{SS}$ between a ring and a ring is approximately 0.05, and the coefficient of friction $\mu_s$ between a ring and a block is approximately 0.10. Accordingly, the ratio $\xi$ of the coefficient of friction is 2.0. In the graph of FIG. 6, $\Delta T_1/\Delta T_{ALL}$ is 0.54 when $\xi = 2.0$, which means that the amount of change $\Delta T_1$ in the tension on the metal ring of the innermost position occupies 54% of the amount of change $\Delta T_{ALL}$ in the tension on the whole aggregate of metal rings.

If the coefficient of friction $\mu_{SS}$ between a ring and a ring is brought into agreement with the coefficient of friction $\mu_s$ between a ring and a block, then $\xi = 1.0$ and $\Delta T_1/\Delta T_{ALL} = 0.08$, and the metal ring of the innermost position shares the amount of change in the tension the same as that for the other eleven metal rings, i.e., shares about one-twelfth or about 8% of the sum $\Delta T_{ALL}$ of the amount of change in the tension on the entire aggregate of the metal rings. If the coefficient of friction $\mu_s$ between a ring and a block is further decreased, then $\Delta T_1/\Delta T_{ALL} = 0$ is accomplished when $\xi = 0.92$, whereby the amount of change in the tension on the metal ring of the innermost position becomes zero. Then, as $\Delta T_1/\Delta T_{ALL}$ becomes smaller than 0, the amount of change in the tension increases again with an increase in the $|\Delta T_1/\Delta T_{ALL}|$. In a state where $\Delta T_1/\Delta T_{ALL} < 0$, the tension on the other metal rings decreases with an increase in the tension on the metal ring of the innermost position, and the tension on the other metal rings increases with a decrease in the tension on the metal ring of the innermost position.

Figure 7:
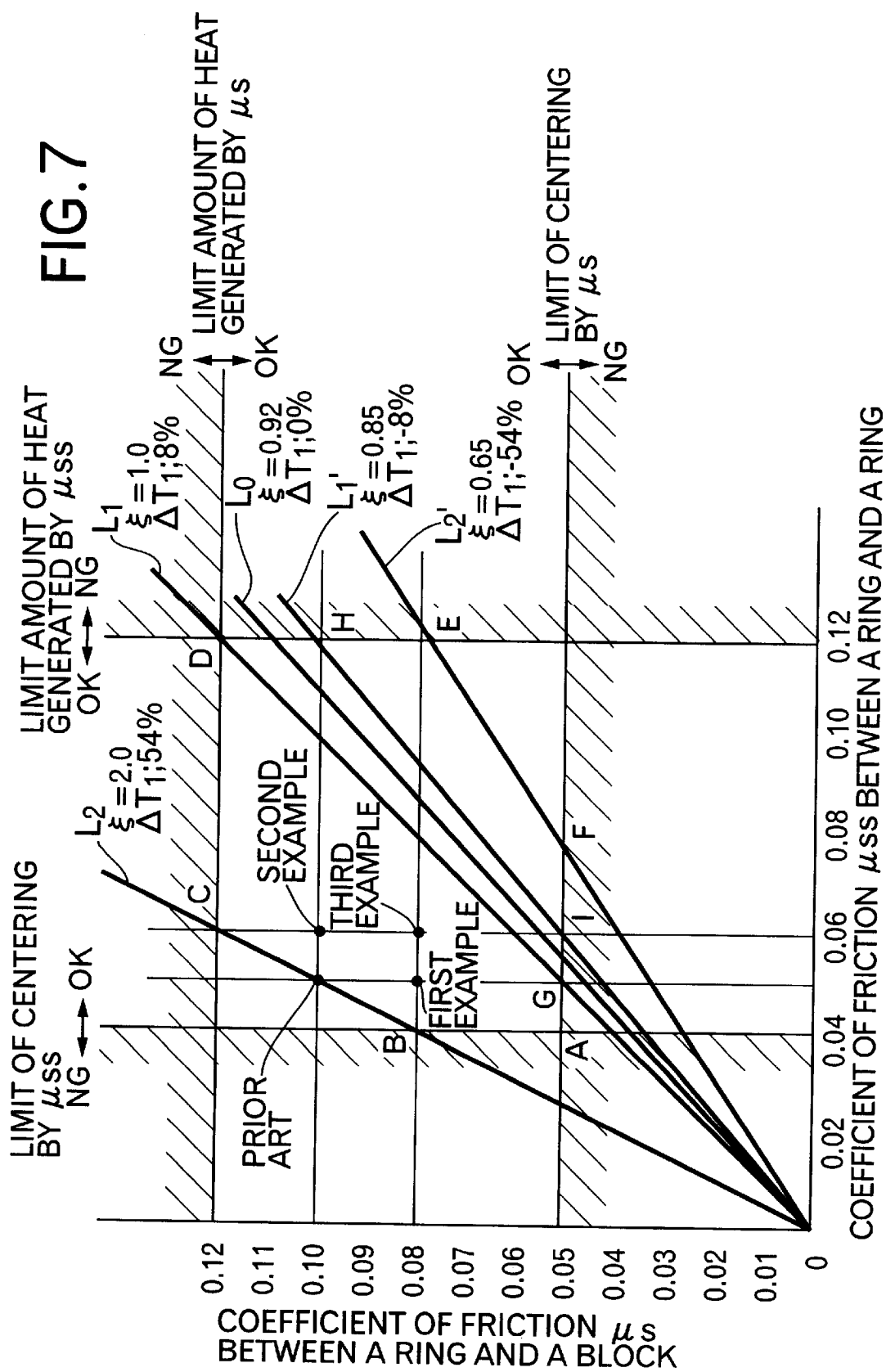

FIG. 7 is a graph in which the abscissa represents the coefficient of friction $\mu_{SS}$ between a ring and a ring, the ordinate represents the coefficient of friction $\mu_s$ between a ring and a block, and the slope of five straight lines $L_2$, $L_1$, $L_0$, $L_1'$ and $L_2'$ passing through the origin correspond to the ratios $\xi$ of the coefficient of friction. The lower limits of the coefficient of friction $\mu_{SS}$ between a ring and a ring and of the coefficient of friction $\mu_s$ between a ring and a block, are determined by the limit of centering of the metal belt, and their upper limits are determined by the limit amount of heat generated by the metal belt.

Figure 2:
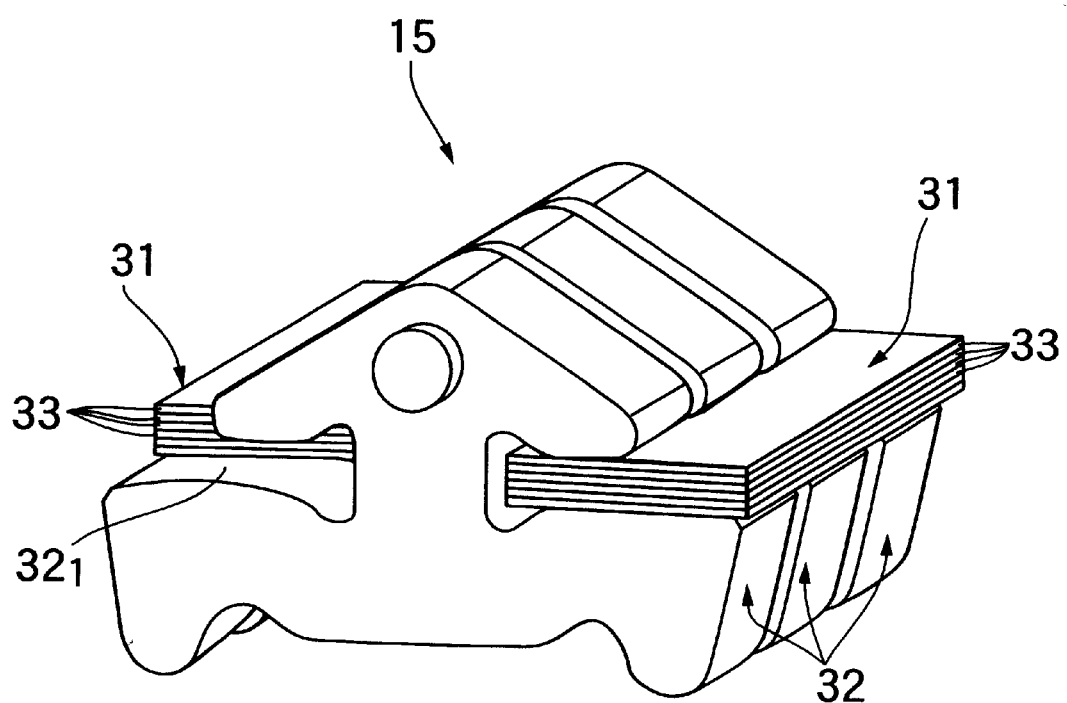

Referring to FIG. 2, the saddle surfaces $32_1$ of the metal blocks 32 are crowned so as to be upwardly protruding in an arcuate shape, and the metal ring of the innermost position in contact with the saddle surfaces $32_1$, is centered on the saddle surfaces $32_1$, due to the frictional force between it and the saddle surfaces $32_1$. The second and subsequent eleven metal rings are successively centered as the metal rings of the inner sides are curved. In a region where the coefficient of friction $\mu_s$ between a ring and a block is smaller than 0.05, however, the frictional force on the saddle surfaces $32_1$ of the metal blocks 32 is not enough for accomplishing the centering. In a region where the coefficient of friction $\mu_{SS}$ between a ring and a ring is smaller than 0.04, the frictional force on the metal rings that are in contact with each other is not enough for accomplishing the centering.

In a region where the coefficient of friction $\mu_s$ between a ring and a block is larger than 0.12 or the coefficient of friction $\mu_{SS}$ between a ring and a ring is larger than 0.12, on the other hand, heat is generated in an increased amount due to the frictional force of contact to adversely affect the durability of the metal rings. Thus as shown in FIG. 7, rectangular region is defined by $0.05 \leq \mu_s \leq 0.12$ and $0.04 \leq \mu_{SS} \leq 0.12$. Hatched areas other than the above region are undesired areas from the standpoint of centering performance or durability due to the heat.

The line $L_0$ corresponds to $\xi=0.92$ and, in this case, $\Delta T_1/\Delta T_{ALL}=0$, i.e., the amount of change $\Delta T_1$ in the tension on the metal ring of the innermost position becomes zero. The line $L_1$ corresponds to $\xi=1$ ($\mu_s=\mu_{SS}$) and, in this case, $\Delta T_1/\Delta T_{ALL}=0.08$, i.e., the amount of change $\Delta T_1$ in the tension on the metal ring of the innermost position becomes equal to the amount of change in the tension on the other metal rings. The line $L_1'$ corresponds to $\xi=0.85$ and, in this case, $\Delta T_1/\Delta T_{ALL}=-0.08$, i.e., the amount of change $\Delta T_1$ in the tension on the metal ring of the innermost position becomes equal to that of the above-mentioned case when $\xi=1$. Thus, upon setting the coefficient of friction $\mu_s$ between a ring and a block and the coefficient of friction $\mu_{SS}$ between a ring and a ring to lie within an optimum region defined by the square GDHI, the amount of change $T_1$ in the tension on the metal ring of the innermost position is prevented from becoming larger than the amount of change in the tension on other metal rings, and the durability of the metal ring of the innermost position that is most subject to being broken, can be improved.

The line $L_2$ corresponds to $\xi=2.0$, i.e., corresponds to the case where a metal ring the same as the other metal rings, is used as the innermost position and, in this case, $\Delta T_1/\Delta T_{ALL}=0.54$, i.e., the amount of change $\Delta T_1$ in the tension on the metal ring of the innermost layer is 54% of the sum $\Delta T_{ALL}$ of the amount of change in the tension on the entire aggregate of metal rings. Therefore, upon setting the coefficient of friction $\mu_s$ between a ring and a block and the coefficient of friction $\mu_{SS}$ between a ring and a ring to lie within an optimum region defined by the square ABCD, the amount of change $\Delta T_1$ in the tension on the metal ring of the innermost layer can be decreased compared to that of the prior art, and the durability of the metal ring of the innermost position can be improved. Furthermore, the line $L_2'$ corresponds to $\xi=0.65$ and, in this case, $\Delta T_1/\Delta T_{ALL}=-0.54$, i.e., the amount of change $\Delta T_1$ in the tension on the metal ring of the innermost position becomes 54%, which is the same as that of the above-mentioned case when $\xi=2.0$. Therefore, upon setting the coefficient of friction $\mu_s$ between a ring and a block and the coefficient of friction $\mu_{SS}$ between a ring and a ring to lie within an optimum region defined by the square IHEF, the amount of change $T_1$ in the tension on the metal ring of the innermost position can be decreased compared to that of the prior art, and the durability of the metal ring of the innermost position can be improved.

From the foregoing, it will be understood that upon decreasing the coefficient of friction $\mu_s$ between a ring and a block so that the ratio $\xi$ of the coefficient of friction will not exceed 2.0, it is possible to increase the durability of the metal ring of the innermost position. The coefficient of friction $\mu_s$ between a metal ring and a block or the coefficient of friction $\mu_{SS}$ between a ring and a ring can be adjusted by changing the angle of the protruding stripes forming the mesh shown in FIG. 3 and FIG. 3A.

TABLE 1

| | Angle α of inclination of protruding stripes of a mesh | | |
|---|---|---|---|
| | 30° | 45° | 60° |
| Coefficient of friction $\mu_{ss}$ between a ring and a ring | 0.06 | 0.05 | 0.04 |
| Coefficient of friction $\mu_s$ between a ring and a block | 0.12 | 0.10 | 0.08 |

Table 1 illustrates the change in the coefficient of friction $\mu_s$ between a ring and a block and the change in the coefficient of friction $\mu_{SS}$ between a ring and a ring, when the protruding stripes of the mesh have a height of 2 μm to 5 μm and a width of 0.1 mm, and when the angle a of inclination of the protruding stripes is changed relative to the lengthwise direction (moving direction) of the metal rings, while maintaining the area of a section of the mesh constant. It will be understood from Table 1 that the coefficient of friction decreases with an increase in the angle α of inclination. The reason is attributed to that as the angle α of inclination of the protruding stripes increases, the protruding stripes easily ride on the oil film; i.e., the protruding stripes have a decreased chance of coming into contact with the metal ring of the lower side or with the saddle surfaces, and the coefficient of friction decreases.

TABLE 2

| | $\xi (= \mu_s/\mu_{ss})$ | $\Delta T_1/\Delta T_{ALL}$ |
|---|---|---|
| Example 1 | 1.60 | 42.3% |
| Example 2 | 1.67 | 45.1% |
| Example 3 | 1.33 | 31.1% |
| Prior art | 2.00 | 54.2% |

Table 2 shows the ratios $\xi$ of the coefficient of friction and the values $\Delta T_1/\Delta T_{ALL}$ in Examples where the coefficient of friction $\mu_s$ between a ring and a block and the coefficient of friction $\mu_{SS}$ between a ring and a ring are adjusted according to the above-mentioned method and in the prior art where they are not adjusted. In the prior art, the coefficient of friction $\mu_{SS}$ is 0.05 between a ring and a ring and the coefficient of friction $\mu_s$ is 0.10 between a ring and a block as described earlier. Accordingly, the ratio $\xi$ is 2.0 and the value $\Delta T_1/\Delta T_{ALL}$ is 0.54.

Example 1 is the case where the coefficient of friction $\mu_s$ between a ring and a block is decreased to 0.08 while maintaining the coefficient of friction $\mu_{SS}$ at 0.05 between a ring and a ring in a customary manner.

Example 2 is the case where the coefficient of friction $\mu_{SS}$ is increased to 0.06 between a ring and a ring while maintaining the coefficient of friction $\mu_s$ at 0.10 between a ring and a block in a customary manner.

Example 3 is the case where the coefficient of friction $\mu_{SS}$ is increased to 0.06 between a ring and a ring and the coefficient of friction $\mu_s$ s is decreased to 0.08 between a ring and a block.

The coefficients of friction $\mu_{SS}$, $\mu_s$ of the prior art and Examples 1 to 3 have been plotted on the graph of FIG. 7. In Examples 1 to 3 as will be apparent from FIG. 7 and Table 2, the values $\Delta T_1/\Delta T_{ALL}$ are all smaller than that of the prior art ($\Delta T_1/\Delta T_{ALL}$=54.2%), and a decrease can be confirmed in the amount of change in the tension on the metal ring of the innermost position. Referring to Example 3, in particular, which is closest to the optimum region defined by the square GDHI in FIG. 7, the value $\Delta T_1/\Delta T_{ALL}$ has been decreased to 31.1%, which is the most striking improvement among Examples 1 to 3.

Figure 8:
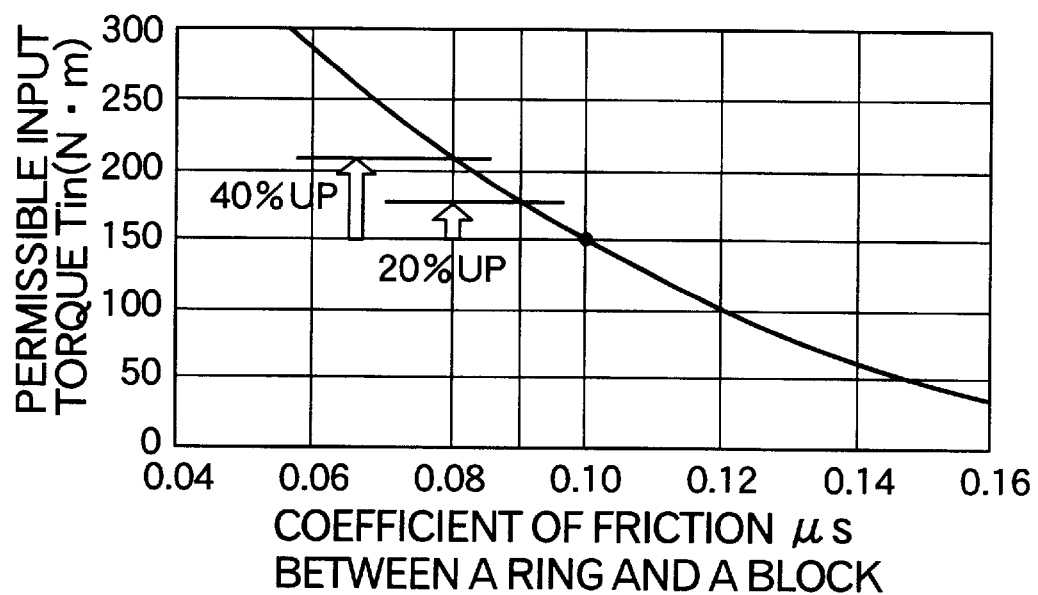

The graph of FIG. 8 shows how the permissible input torque to the continuously variable transmission varies accompanying a decrease in the amount of change in the tension on the metal ring of the innermost position when the continuously variable transmission is operated at a ratio of 0.61, input rotational speed of 6000 rpm, and a margin torque of 2 kgf-m, while maintaining the coefficient of friction $\mu_{SS}$ between a ring and a ring at 0.05 in a customary manner and decreasing the coefficient of friction $\mu_s$ between a ring and a block from the conventional value of $\mu_s$=0.10. It will be understood from FIG. 8 that the permissible input torque increases by about 20% when the coefficient of friction $\mu_s$ between a ring and a block is decreased from a conventional value of $\mu_s$=0.10 down to 0.09 and increases by about 40% when it is decreased down to 0.08.

Figure 3A:
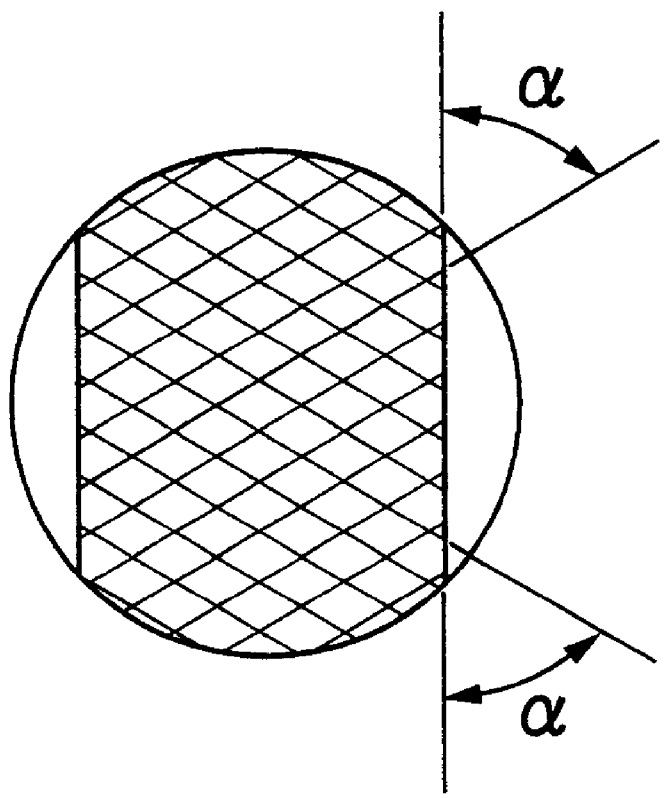
FIG. 3A is a view showing a modified form of protruding stripes with a larger inclination angle than the stripes of FIG. 3.

In the above embodiment, the angle α of inclination of protruding stripes forming the mesh is changed in order to adjust the coefficients of friction $\mu_s$, $\mu_{SS}$ on the inner peripheral surfaces of the metal rings as shown by way of example in FIG. 3A. It is, however, also possible to form a ruggedness of a shape different from the mesh or to effect the surface with a treatment such as applying a coating to the metal rings.

Though the embodiment of the invention was described above in detail, it should be noted that the present invention can be variously modified in design without departing from the spirit and scope of the invention.

What is claimed is:

1. A belt for a continuously variable transmission comprising an aggregate of metal rings formed by laminating a plurality of pieces of endless metal rings one on another and a plurality of metal blocks having saddle surfaces, said metal blocks being supported by said metal rings, wherein the ratio of the coefficient of friction between an innermost one of said metal rings in contact with said saddle surfaces of said metal blocks and said saddle surfaces to the coefficient of friction between said metal rings in contact with one another is smaller than 2.0 and larger than 0.65.

2. A belt for a continuously variable transmission according to claim 1, wherein the coefficient of friction between said innermost metal ring in contact with said saddle surfaces of said metal blocks and said saddle surfaces is substantially equal to the coefficient of friction between said metal rings in contact with one another.

3. A belt for a continuously variable transmission according to claim 1 or 2, wherein each of said metal rings has a plurality of protruding stripes on an inner peripheral surface thereof, said stripes being inclined relative to the direction of movement of said metal ring, and wherein the angle of inclination of said stripes of said innermost metal ring is larger than the angle of inclination of said stripes on the other metal rings.

4. A belt for a continuously variable transmission according to claim 1, wherein said innermost one of said metal rings has an inner peripheral surface that contacts said saddle surfaces of the metal blocks, said inner peripheral surface of said inner most ring having a surface structure different from that of the inner peripheral surfaces of a remainder of said aggregate metal rings.

* * * * *